March 12, 1940.  S. TACKLER  2,193,573
ALUMINUM LINED SHELL
Filed June 16, 1939

INVENTOR
Samuel Tackler
BY
ATTORNEY

Patented Mar. 12, 1940

2,193,573

UNITED STATES PATENT OFFICE 2,193,573

ALUMINUM LINED SHELL

Samuel Tackler, New York, N. Y.

Application June 16, 1939, Serial No. 279,461

3 Claims. (Cl. 102—16)

This invention relates to new and useful improvements in aluminum lined shells and methods for the manufacture thereof.

The invention has for an object the construction of a shell characterized by aluminum lining therein to facilitate the manufacture and improve the cartridge.

Still further the invention contemplates the provision of the aluminum material for increasing the strength of the shell.

As a further object the invention contemplates the use of the aluminum lining for increasing the internal lubricative quality of the shell so that the gases liberated by the explosion may more efficiently hurl the projectile forward.

Still further the invention contemplates a novel arrangement for securely holding the aluminum lining within the shell.

Another object of the invention resides in a novel arrangement for reinforcing the aluminum lining.

Still further the invention proposes a novel method of forming the aluminum lined shells.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

The aluminum lined shell, according to this invention, includes a drawn brass shell 10 and a drawn aluminum sheet 11, lining the inner face of said shell. The shell 10 has an open outer end 10$^a$ and a closed inner end 10$^b$. This inner end is formed with an outwardly bulged area 10$^c$.

The drawn aluminum lining 11 is similarly formed as the shell 10. It is provided with an open outer end 11$^a$, a closed inner end 11$^b$, and a projecting area portion 11$^c$. The aluminum lining is in intimate contact with the shell 10 throughout its interior face area.

One method of forming the shell consists in superimposing an aluminum sheet upon a brass sheet and then stamping and drawing the shell so that sheets are simultaneously formed into the shell.

Figure 1:
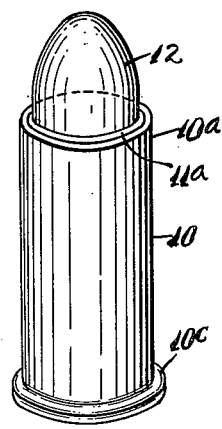
Fig. 1 is a perspective view of a cartridge constructed according to this invention.
Figure 2:
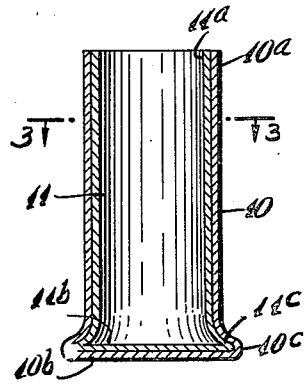
Fig. 2 is a longitudinal sectional view of the shell portion of the cartridge, illustrated per se.
Figure 3:
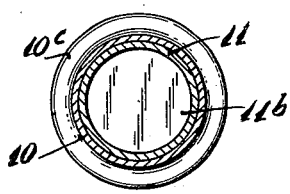
Fig. 3 is a sectional view of the shell taken on the line 3—3 of Fig. 2.
Figure 5:
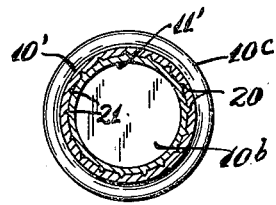
Fig. 5 is a horizontal sectional view similar to Fig. 3, but illustrating the modified construction shown in Fig. 4.
Figure 4:
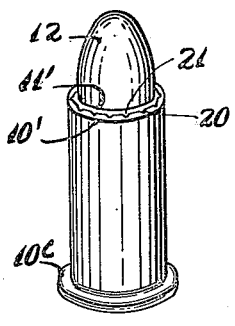
Fig. 4 is a perspective view of the cartridge constructed according to another form of this invention.
Figure 7:
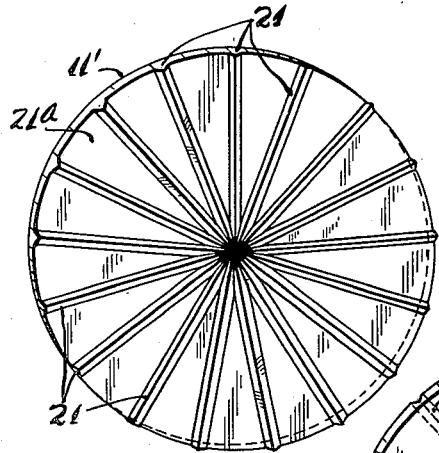
Fig. 7 is a similar view to Fig. 6 but illustrating the aluminum lining member.
Figure 6:
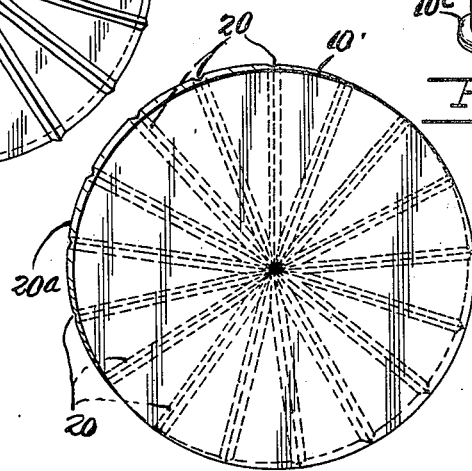
Fig. 6 is a schematic perspective developed view of the outer shell member before stamping, of the device illustrated in Fig. 4.

In Fig. 1 a cartridge is shown formed from the shell. This cartridge has a slug 12 engaged in the open end thereof. Suitable explosive material, not shown on the drawing, is housed within the bullet, as is customary.

In Figs. 4 to 7 another modified form of the invention has been disclosed in which the aluminum lined shell is made from a brass shell disc 10' having spaced radial V-shape grooves 20 on one face 20$^a$, adapted to be engaged by similarly arranged and shaped interlocking radial ridges 21 on one face 21$^a$ of the corresponding aluminum lining disc 11'. The aluminum shell disc 11' is superimposed upon the brass shell disc 10' and a shell is drawn and formed with the usual closed bottom end 10$^b$ having a projecting adjacent area 10$^c$. Numeral 12 indicates the slug of the shell. These double sheets, form a solid aluminum lined shell body, which will firmly stay together.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. An aluminum lined shell, comprising a drawn brass shell, and a drawn aluminum sheet lining the inner face of said shell, and said brass shell having a cylindrical wall portion, a closed bottom end, and a projecting area encircling said bottom end, said brass shell being formed with radially extending grooves on its closed end and longitudinally extending grooves along its sides, and said aluminum sheet lining being formed with corresponding radially arranged ridges adapted to firmly engage the said grooves in the brass shell.

2. An aluminum lined shell, comprising a drawn brass shell, and a drawn aluminum sheet ng the inner face of said shell, and said brass ll having a cylindrical wall portion, a closed tom end, and a projecting area encircling said tom end, said brass shell being formed with ially extending grooves on its closed end and gitudinally extending grooves along its sides, i said aluminum sheet lining being formed h corresponding radially arranged ridges ipted to firmly engage the said grooves in the ss shell, said grooves and ridges being arıged along the adjacent surfaces of the brass ll and aluminum lining, respectively, and be- of V shape in cross section.

. A shell, comprising a drawn brass shell having a cylindrical wall portion and a closed bottom end, a drawn aluminum sheet lining the inner face of said brass shell and following the contour thereof, said shell being formed with a plurality of radially extending grooves on the inner face of its closed end and said sheet of aluminum being formed with a plurality of complementary arranged radial ridges engaging into said grooves, said shell being formed with a plurality of longitudinally extending grooves continuing from the ends of said radial grooves and along the inside face of said cylindrical wall portion and said sheet being formed with a plurality of complementary arranged ridges continuing from the ends of said radial ridges and engaging into said longitudinal grooves.

SAMUEL TACKLER.